(No Model.)  2 Sheets—Sheet 1.
C. J. PAINE.
ORE CONCENTRATOR.
No. 597,617. Patented Jan. 18, 1898.
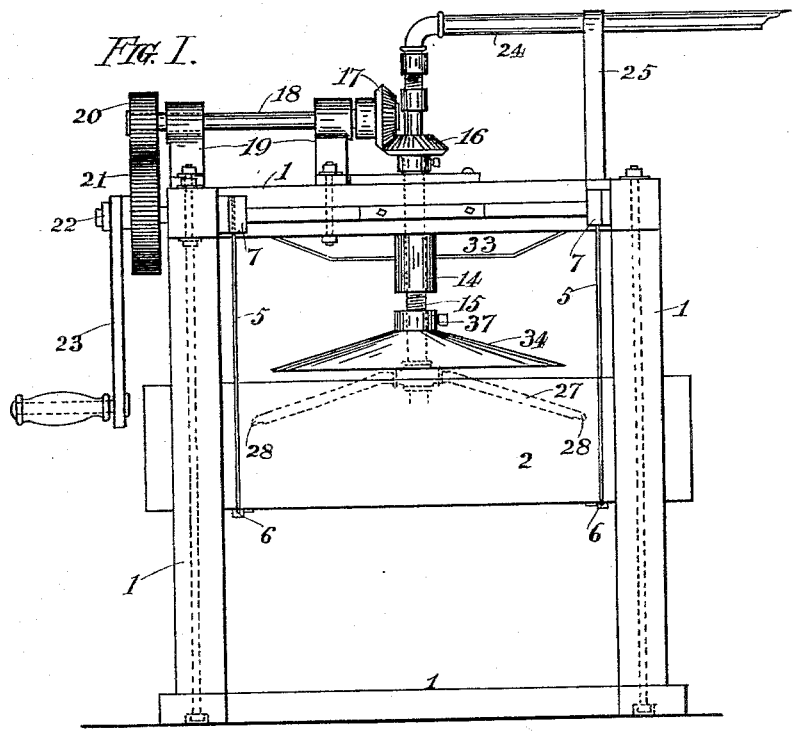
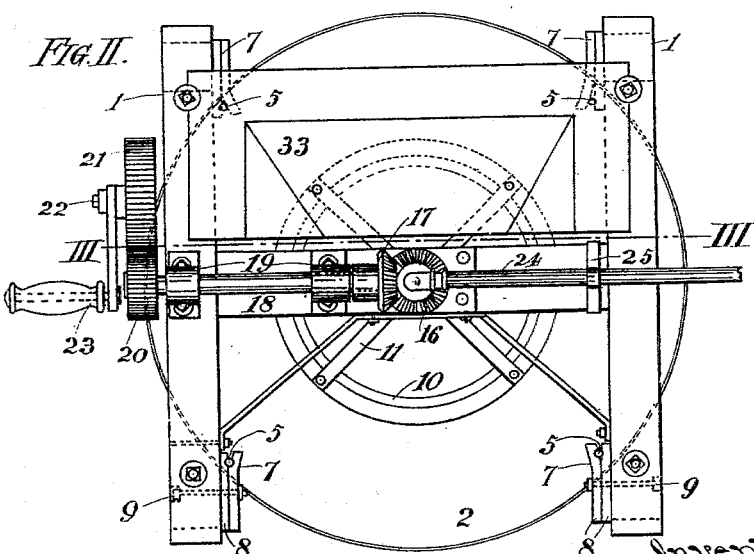
Witnesses:
Robt. Train
J. A. Roelofsz
Inventor.
Clinton J. Paine
Knight Bros.
Attorneys.
THE NORRIS PETERS CO., PHOTO-LITHO., WASHINGTON, D. C.

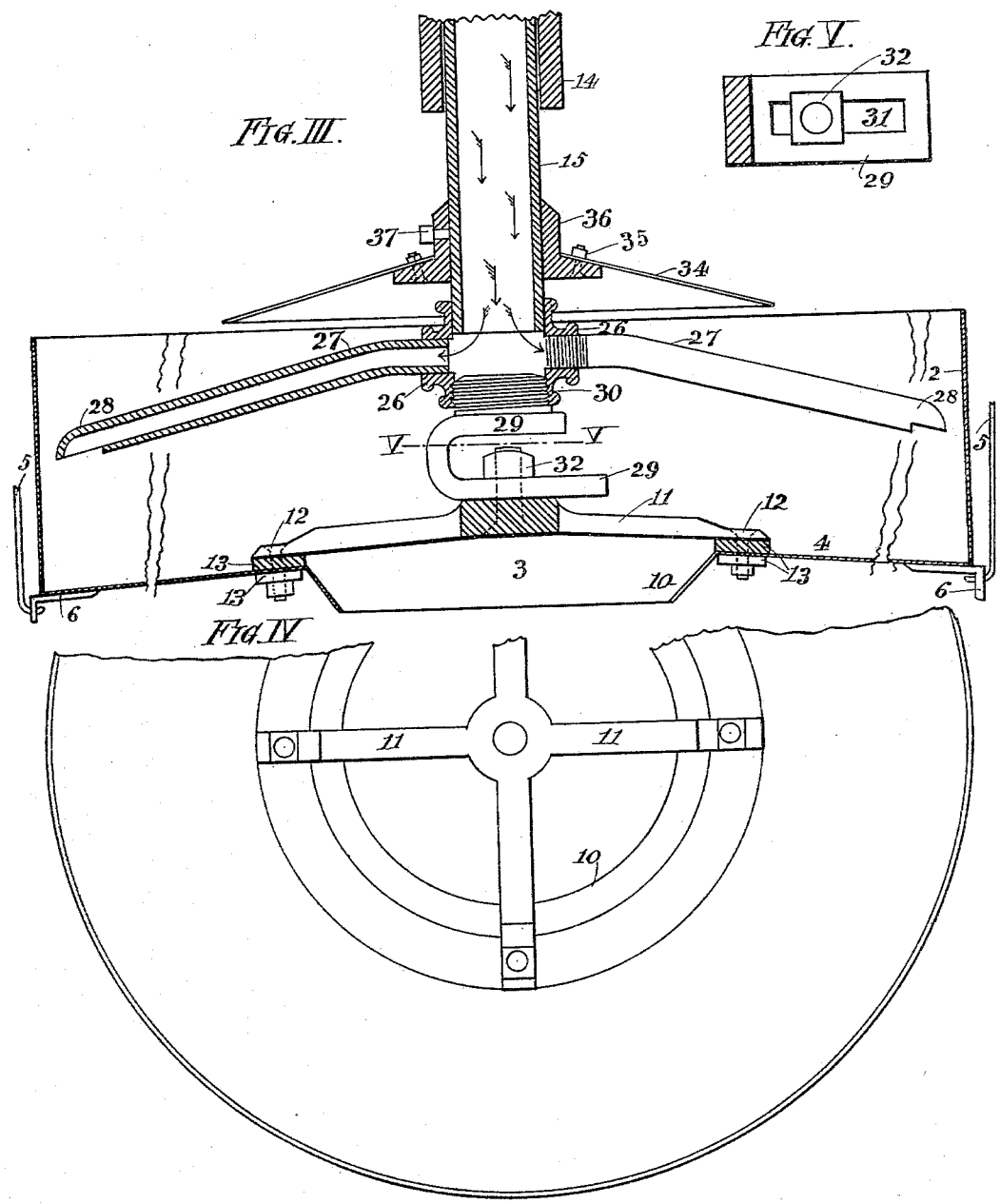

UNITED STATES PATENT OFFICE.

CLINTON J. PAINE, OF NATIONAL MILITARY HOME, CALIFORNIA, ASSIGNOR OF ONE-HALF TO AXEL S. JOHNSON, OF SAME PLACE.

ORE-CONCENTRATOR.

SPECIFICATION forming part of Letters Patent No. 597,617, dated January 18, 1898.

Application filed July 12, 1897. Serial No. 644,255. (No model.)

*To all whom it may concern:*

Be it known that I, CLINTON J. PAINE, a citizen of the United States, residing at the National Military Home, in the county of Los Angeles and State of California, have invented certain new and useful Improvements in Ore-Concentrators, of which the following is a full, clear, and exact description, reference being had to the accompanying drawings, which form a part of this specification.

My invention relates to an improved machine for concentrating precious metals either in their placer or pulverized condition; and my invention consists in certain features of novelty hereinafter described and claimed.

Figure I represents a side elevation of my improved machine. Fig. II is a top view. Fig. III is an enlarged section taken on line III III, Fig. II. Fig. IV is an enlarged broken plan view of the agitating-pan. Fig. V is a section taken on line V V, Fig. III, showing the connection between the pan and the operating mechanism.

Referring to the drawings, 1 represents the framework of my improved machine, by which the various parts are supported.

2 represents the concentrating-pan, into which the pulverized ore or placer material is discharged and worked, the precious metal being concentrated in the pan and the tailings discharged through a central aperture 3 in the pan. The pan 2 is circular or round in horizontal section and is provided with a bottom 4, which inclines outwardly and downwardly from the outer edge of the central aperture 3 to the vertical outer wall of the pan. The pan 2 is supported at several points, preferably four, by means of vertical steel rods 5, the lower ends of said rods being secured to brackets 6, said brackets being in turn secured to the bottom of the pan 2. The upper ends of the rods 5 are rigidly secured to clamps 7, located near the upper end of the frame 1, said clamps consisting of two strips of metal 8, adjustably secured to the frame 1 by means of bolts 9 and having slight recesses into which the rods 5 rest in order to form a firm hold upon the same. The bottom of the pan 4, surrounding the orifice 3, is bent downwardly and inwardly, as shown at 10, to give direction to the tailings that pass through said orifice.

11 represents a spider having its outer ends secured by bolts 12 near the inner portion of the inclined part 4 of the bottom of the pan. 13 represents annular metal rings placed above and below the bottom of the pan and to which the spider 11 is also secured by the bolts 12, passing through said rings, the rings serving to brace and strengthen the bottom of the pan.

14 represents a vertically-extending collar or sleeve secured to the central portion of the frame 1.

15 represents a hollow shaft operating within the sleeve 14, having an adjustable beveled gear 16 thereon, with which meshes a beveled gear 17 on the inner end of a horizontal shaft 18, the shaft 18 being journaled to brackets 19, which are secured to the frame 1.

20 represents a pinion-gear on the opposite end of the shaft 18, and 21 a driving-gear mounted on a shaft 22, which is also journaled to the frame 1.

23 represents a crank through which power may be applied to the driving mechanism, or the crank may be substituted, if desired, by a pulley and steam or other power applied for driving the machine.

24 represents a detachable water-conducting pipe having its inner end suitably supported by a brace 25, the extreme inner end of said pipe telescoping into the hollow shaft 15 for the purpose of conveying water from any suitable source of supply to the hollow shaft.

26 represents a double T-coupling secured to the lower end of the hollow shaft 15, said coupling having the inner ends of distributing-pipes 27 secured thereto, said distributing-pipes radiating from the hollow shaft outwardly and downwardly to a point inside the outer wall of the concentrating-pan 3, whereby the water descending through the hollow shaft 15 is distributed into the concentrating-pan. The outer ends of said distributing-pipes are provided with overhanging hoods 28, which, while permitting the water to escape freely, prevent its being thrown upwardly and directing it onto the material being acted upon in the pan. The distributing-pipes may be of greater or less length than that shown in the drawings, if found desirable.

29 represents a U-shaped bracket having a screw-plug 30 on one of its arms, said plug screwing into the outer end of the T-coupling 26, thus forming a connection between said bracket and the hollow operating-shaft 15. The opposite arm of the bracket 29 is provided with a slot 31, by which means the spider 11 may be adjustably connected to the bracket by means of a bolt 32. Thus as the shaft 15 is revolved by the mechanism described a circular or gyratory movement is transmitted through the bracket 29 to the pan 2, said movement of the pan describing a greater or less circle, according to the adjustment of the bolt 32 inwardly or outwardly in the slot 31, said adjustment and movement being necessary owing to the varying quality of the materials being acted upon. Owing to the supporting-rods 5, secured to the pan, the gyratory movement is transmitted to the pan, throwing the heavier particles of the ore to the outer circumference of the pan and allowing the lighter particles to pass out as tailings through the central orifice 3.

33 represents a hopper through which the material to be acted upon passes into the concentrating-pan.

34 represents a distributer formed in the shape of a truncated cone, onto which the material dropping from the hopper falls and is equally distributed into the concentrating-pan. The distributer 34 is secured by bolts 35 to a collar 36, adjustably secured to the hollow shaft 15 by means of a set-screw 37, the distributer being thus vertically adjustable on the shaft and rotating with the shaft as the same revolves, thus equally distributing the material into the concentrating-pan.

I claim as my invention—

1. In an ore-concentrator, the combination of a concentrating-pan having a central orifice in its bottom, an operating-shaft, a U-shaped bracket connecting the operating-shaft with the pan said bracket being removably secured to the operating-shaft by means of a screw-plug and a slot in said bracket for adjusting the throw of the pan, substantially as set forth.

2. In an ore-concentrator, the combination of a concentrating-pan, a hollow operating-shaft, a double T-coupling on the lower end of the operating-shaft, a bracket having a screw-plug secured to the lower end of the T-coupling on one of its sides and having its opposite side adjustably secured to the bottom of the pan, and distributing-pipes connected with the T-coupling, substantially as set forth.

CLINTON J. PAINE.

Witnesses:
G. A. JOHNSON,
J. W. KEMP.